No. 800,791. PATENTED OCT. 3, 1905.
F. K. BOWDEN.
APPARATUS FOR PURIFYING WATER OR AGING LIQUIDS.
APPLICATION FILED JUNE 5, 1905.
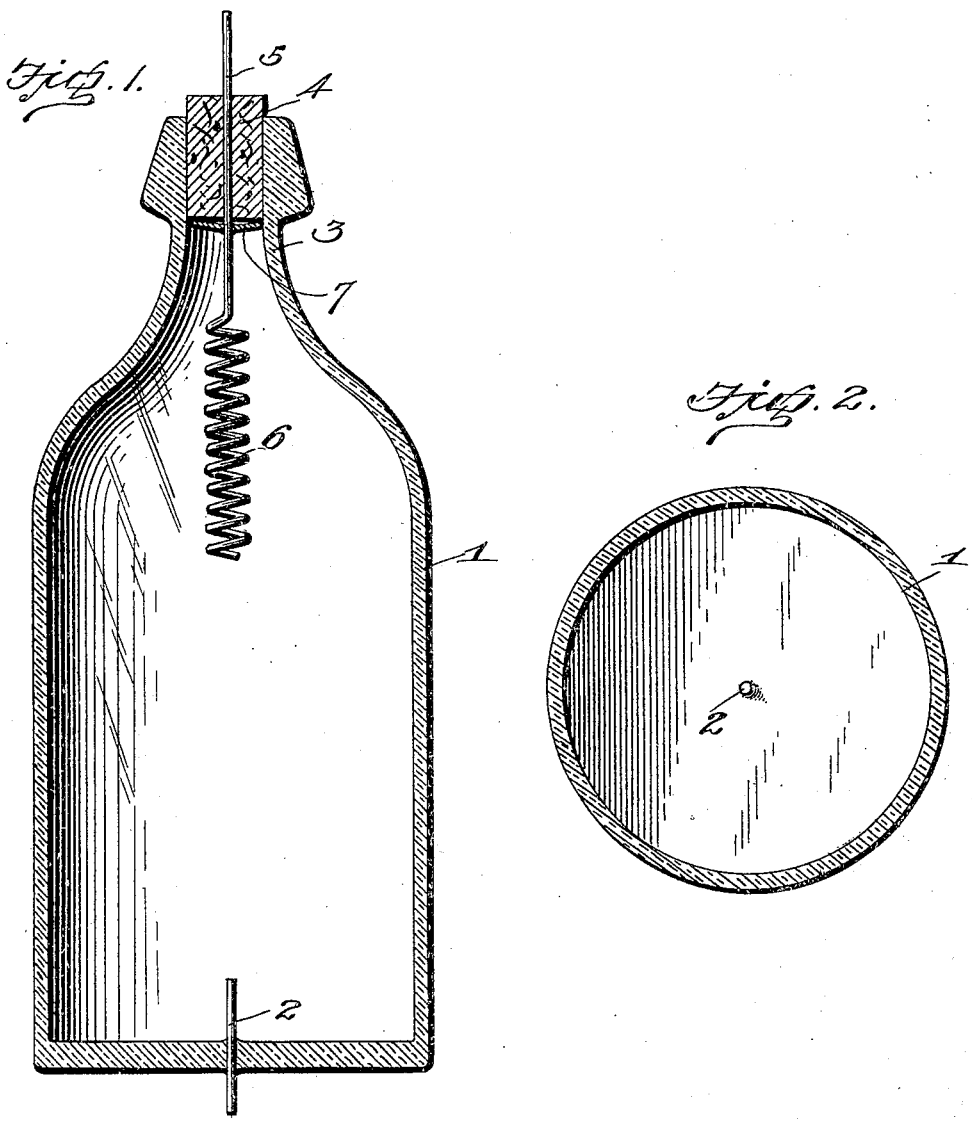

UNITED STATES PATENT OFFICE.

FREDERICK K. BOWDEN, OF SAN JOSE, CALIFORNIA.

APPARATUS FOR PURIFYING WATER OR AGING LIQUIDS.

No. 800,791.      Specification of Letters Patent.      Patented Oct. 3, 1905.

Application filed June 5, 1905. Serial No. 263,815.

*To all whom it may concern:*

Be it known that I, FREDERICK K. BOWDEN, a citizen of the United States, residing at San Jose, in the county of Santa Clara and State of California, have invented certain new and useful Improvements in Apparatus for Purifying Water or Aging Liquids; and I do declare the following to be a full, clear, and exact description of the invention, such as will enable others skilled in the art to which it appertains to make and use the same.

My invention relates to improvements in an apparatus for purifying water or aging liquids; and it consists in the construction, combination, and arrangement of parts herein shown and described.

The object of the invention is to provide a simple and inexpensive bottle or similar container in which liquids may be subjected to electrolytic action for the purpose of removing all impurities, whether they be in suspension or solution, and by means of which the liquid may be heated and any air within the bottle exhausted therefrom.

The above and other objects, which will appear as the nature of my invention is better understood, are accomplished by means of the construction illustrated in the accompanying drawings, in which—

Figure 1 is a sectional view through a bottle constructed in accordance with my invention, and Fig. 2 is a transverse sectional view taken on the line 2 2 in Fig. 1.

Referring to the drawings by numeral, 1 denotes a bottle or other container, of glass or similar material, which is provided in its bottom with an electrode 2. The latter is preferably in the form of a platinum wire, which is molded in the bottle, as shown. The neck 3 of the bottle is closed by a removable stopper or plug 4, formed, preferably, of cork and having extending therethrough an electrode 5. This electrode 5 is also preferably in the form of a piece of platinum wire and has its lower or inner end, which is disposed within the bottle, coiled, as shown at 6, so that it may be adjusted to any length by stretching or contracting the coil 6, the wire being flexible, but not resilient. Secured upon the wire or electrode 4 is a cap 7, which engages the lower end of the cork or plug, as shown.

The use and advantages of the invention will be readily understood. When an electric current from a battery, dynamo, or other generator is passed through the two electrodes 2 and 5, the liquid within the bottle will be subjected to electrolytic action, which will remove all impurities, so that such liquids as beer, ale, porter, and the like which require the removal of all air therefrom may be preserved. The current may be readily controlled by a rheostat or bank of lamps, so that the temperature to which the liquid is heated by the current may be readily controlled.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described apparatus for purifying water or aging liquids, comprising the non-conducting container, the electrode permanently secured in the lower portion thereof, the removable plug in the neck of said container and the electrode extending through the said plug, into the upper portion of the container terminating at its lower end in the extension-coil and provided at a point above said coil with the cap forming a stop and engaging the lower end of the plug.

In testimony whereof I have hereunto set my hand in presence of two subscribing witnesses.

FREDERICK K. BOWDEN.

Witnesses:
   WILLIAM A. BOWDEN,
   P. J. DUNNE.